US012655262B2

(12) United States Patent (10) Patent No.: US 12,655,262 B2

Bezuidenhout (45) Date of Patent: Jun. 16, 2026

(54) PROCESS OF DYING POLYMER PARTS

(71) Applicant: Howmedica Osteonics Corp., Mahwah, NJ (US)

(72) Inventor: Michael Bezuidenhout, Portage, MI (US)

(73) Assignee: Howmedica Osteonics Corp., Mahwah, NJ (US)

( * ) Notice: Subject to any disclaimer, the term of this patent is extended or adjusted under 35 U.S.C. 154(b) by 592 days.

(21) Appl. No.: 18/181,812

(22) Filed: Mar. 10, 2023

(65) Prior Publication Data

US 2023/0287190 A1 Sep. 14, 2023

Related U.S. Application Data

(60) Provisional application No. 63/318,531, filed on Mar. 10, 2022.

(51) Int. Cl.
C08J 7/04 (2020.01)
C08J 7/02 (2006.01)
C08J 7/12 (2006.01)

(52) U.S. Cl.
CPC . C08J 7/04 (2013.01); C08J 7/02 (2013.01); C08J 7/12 (2013.01)

(58) Field of Classification Search
CPC ........ C08J 7/04; C08J 7/02; C08J 7/12; D06P 1/44; D06P 1/445; D06P 1/00; D06P 1/0004; D06P 1/16; D06P 1/34; D06P 1/39; D06P 1/41; D06P 1/22; D06P 3/004; D06P 3/79; D06P 3/794; B33Y 10/00; B29C 64/35; B29C 64/30; B29C 71/009
See application file for complete search history.

(56) References Cited

U.S. PATENT DOCUMENTS

| 12,151,435 B2 * | 11/2024 | Folger | D06P 3/005 |
| 2021/0170702 A1 * | 6/2021 | Abstreiter | B33Y 10/00 |
| 2024/0084146 A1 * | 3/2024 | Yamada | C09D 11/037 |

FOREIGN PATENT DOCUMENTS

| EP | 3587092 A1 | 1/2020 |
| WO | 2019/201922 A1 | 10/2019 |
| WO | 2019/201932 A1 | 10/2019 |

(Continued)

OTHER PUBLICATIONS

Extended European Search Report issued in Appln. No. 23161250.8 mailed Jun. 29, 2023 (4 pages).

*Primary Examiner* — Michael P Wieczorek
(74) *Attorney, Agent, or Firm* — Lerner David LLP

(57) ABSTRACT

Provided is a method of dyeing or otherwise surface treating a polymer part so as to provide a treated polymer part with a surface additive which has wash fastness with respect to alcohol solutions and therefore does not leach or transfer in response to contact with alcohol. The method includes preparing a surface treatment solution comprising a solvent and the surface additive; submerging a polymer part in the surface treatment solution for a set time period before in order to coat the surface of the part with the additive; air drying the part; vapor polishing the part by exposing an outer surface to vaporized hexafluoroisopropanol in order to bind the additive within the polymer; and finally washing the fixed coated part in a surfactant and water solution to produce a finished surface treated polymer part.

18 Claims, 10 Drawing Sheets

(56) References Cited

FOREIGN PATENT DOCUMENTS

| WO | 2020/099096 | A1 | | 5/2020 | | |
|----|-------------|-----|---|--------|---|---|
| WO | 2020/234240 | A1 | | 11/2020 | | |
| WO | WO-2021170867 | A1 | * | 9/2021 | ............. | B33Y 70/00 |

* cited by examiner

| IPA 1400mls | FA 600mls | → Add parts → | 25min exposure | One Water dip | → AMT |

Solution mixed at 1000rpm for 20min @40C

IPA helps keep the Carbon Black (CB) in suspension and stops it from aggregating, on part removal the IPA at 40°C quickly evaporates causing the CB to collapse onto the nearest surface.

25 min +water dip sample

FA dyed part 33 min at room temp in 30% IPA

25min exposure → No Water wash → AMT

White precipitates from on the surface of the part suspect due to unremoved 2P or Glycol reacting with the HFIP

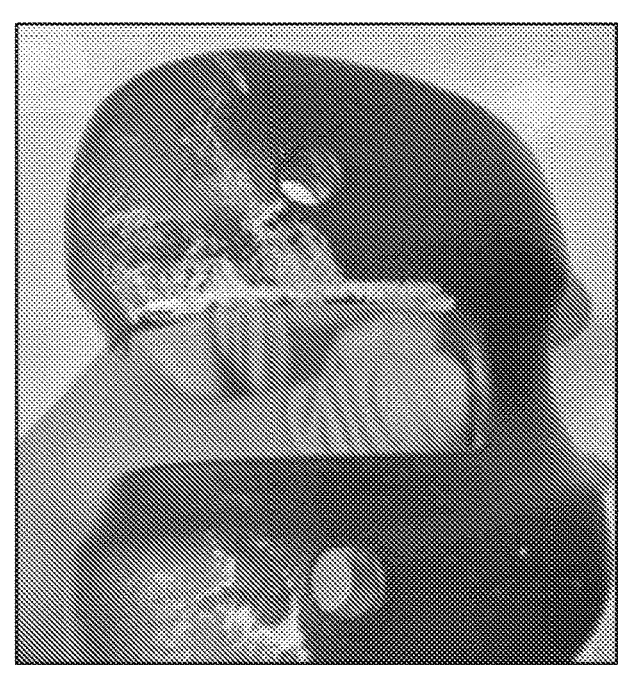
Figure 7
Overnight exposure
Excess CB collapse and aggerates started to form
AMT

PROCESS OF DYING POLYMER PARTS

CROSS-REFERENCE TO RELATED APPLICATION(S)

This application claims the benefit of the filing date of U.S. Provisional Application No. 63/318,531, filed Mar. 10, 2022, the disclosure of which is hereby incorporated herein by reference.

BACKGROUND OF THE DISCLOSURE

Polymer (e.g. nylon) parts are widely used in the medical field for diverse applications, including applications both internal (e.g. surgical or prosthetic devices) and external to the human body (e.g. medical splints, casts, or carts). Printed or additive polymer parts in particular have generated interest in recent years due to the versatile and economical nature of additive manufacturing processes.

Often, it is desirable for a surface coating or additive to be added to a polymer medical part, after is it manufactured. For example, it is desirable for polymer medical parts to be colored by dyes or inks for both functional (e.g. visualization) and aesthetic (e.g. minimizing appearance of stains) reasons. Accordingly, surface dyeing methods for polymer medical parts are known in the art. For example, a typical process (as depicted in FIG. 1) includes imparting color to nylon parts using acid-based dyes, such as in commercial Rit dye, under heat near 95° C.

Unfortunately, this process has a number of disadvantages, including the fact that certain polymers can be subject to dimensional change as a result of exposure to elevated temperatures for extended periods of time. Further, dye imparted to polymer parts by this typical dyeing process readily leaves the part under exposure to alcohol solutions. Accordingly, parts dyed using this process may be incompatible with many surface cleaning wipes contain isopropyl alcohol ("IPA"), and may cause a user to doubt the cleanliness of the surface when color readily transfers from the polymer part to the wipes. As a result, there is a need for a method of dyeing or otherwise surface treating polymer medical parts, which does not expose the parts to heat and which does create an alcohol fast dye or other surface treatment.

BRIEF SUMMARY

The present disclosure provides a method of dyeing or otherwise surface treating a polymer part so as to provide a treated polymer part with a surface additive which has wash fastness with respect to alcohol solutions and therefore does not leach or transfer in response to contact with alcohol. The method of the present disclosure is also advantageous in that elevated temperatures, such as about 95° C. and above, are not used.

The disclosed method for preparing a polymer part with an alcohol fast surface additive may include preparing a surface treatment solution comprising a solvent and the surface additive; submerging a polymer part in the surface treatment solution for a set time period in order to coat the surface of the part with the additive; air drying the part in which the surface treatment solution is chosen such as to accelerate the drying process; vapor polishing the part by exposing an outer surface to vaporized hexafluoroisopropanol (HFIP) under vacuum in order to encapsulate and bind the additive within the polymer through entanglement; and finally washing the fixed coated part in a surfactant and water-based solution to produce a finished surface treated polymer part.

BRIEF DESCRIPTION OF THE DRAWINGS

The features, aspects, and advantages of the present invention will become better understood with regard to the following description, appended claims, and accompanying drawings, in which:

FIG. 7 is a diagrammatic representation of a surface dyeing process according to Comparative Example 2 of the present disclosure and a depiction of the results of the same process.

DETAILED DESCRIPTION

The present disclosure will now be described more fully hereinafter with reference to the accompanying drawings, in which some, but not all aspects of the disclosure are shown. Indeed, the disclosure may be embodied in many different forms and should not be construed as being limited to the aspects set forth herein.

As used herein, the terms "fast" or "fastness" refer to the ability for a dye or surface additive to remain adhered to a polymer part and resist leaching away or transferring. As used herein, the term "alcohol fast" refers to an absence of leaching or transfer of dye or surface additive after exposure to a 30% alcohol solution at room temperature for about 30 minutes, or more preferably after exposure to a 99% alcohol solution at room temperature for approximately 8 hours. As used herein, the term "surface treatment solution" may refer not only to a true solution, but also to a dispersion, a suspension, or any other form of mixture.

As used herein, "fusing agent" is an ink-based additive suitable for use in the manufacture of multi jet fusion ("MJF") additive parts, which aids the polymer fusing process through absorption of radiant heat energy in the printing process.

The present technology provides a method of surface treating a polymer part so as to provide a treated polymer part with a surface additive which has wash fastness with respect to alcohol solutions and therefore does not leach or transfer in response to contact with alcohol. The method of the present disclosure is also advantageous in that elevated temperatures, such as about 95° C. and above, are not used.

The polymer part of the present technology may comprise one or more of nylon, nylon glass bead, thermoplastic polyurethane, and thermoplastic amide. According to some aspects, the polymer part may be a printed part or a part formed through additive manufacturing, while in other aspects the polymer part may be formed by traditional methods such as injection molding, casting, subtractive manufacture from raw stock, and similar suitable methods.

Surface Dyeing Method and Surface Dyed Part

Figure 1:
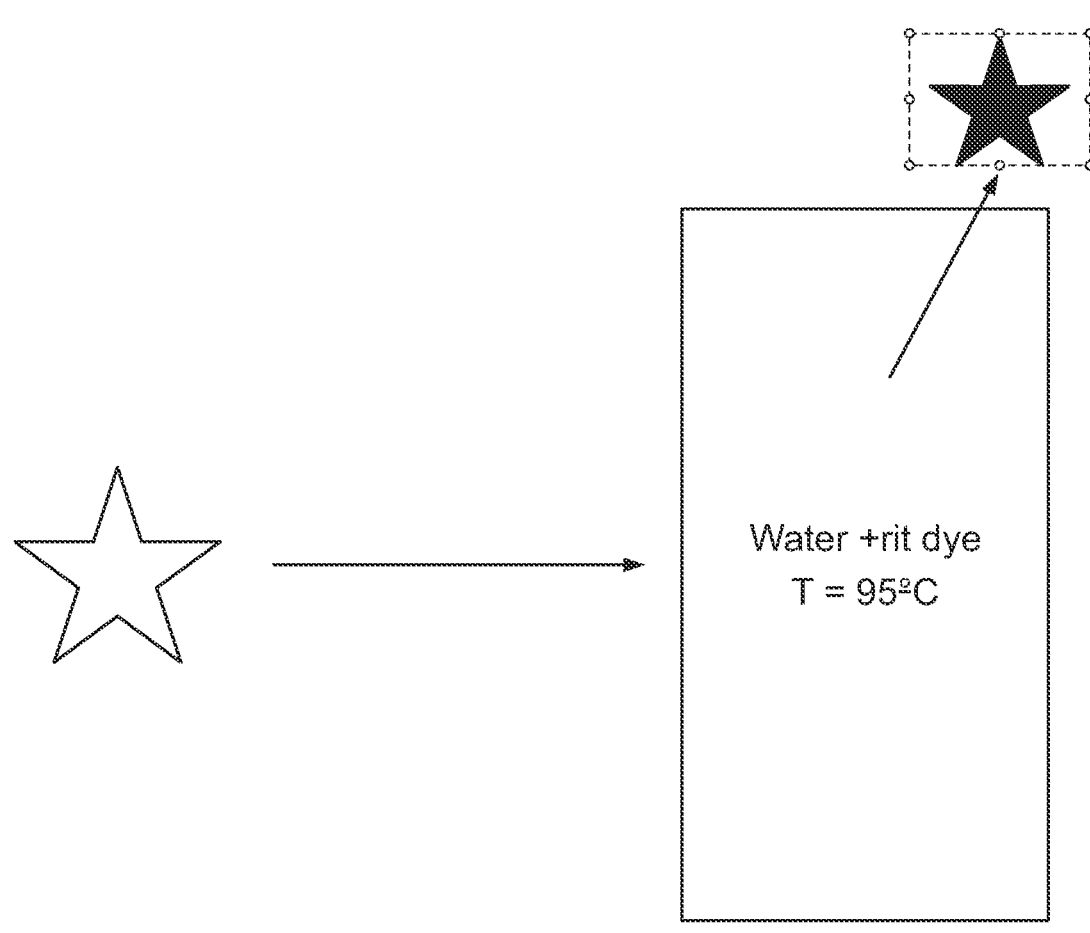
FIG. 1 is diagrammatic representation of a conventional surface dyeing method for a polymer part.
Figure 2A:
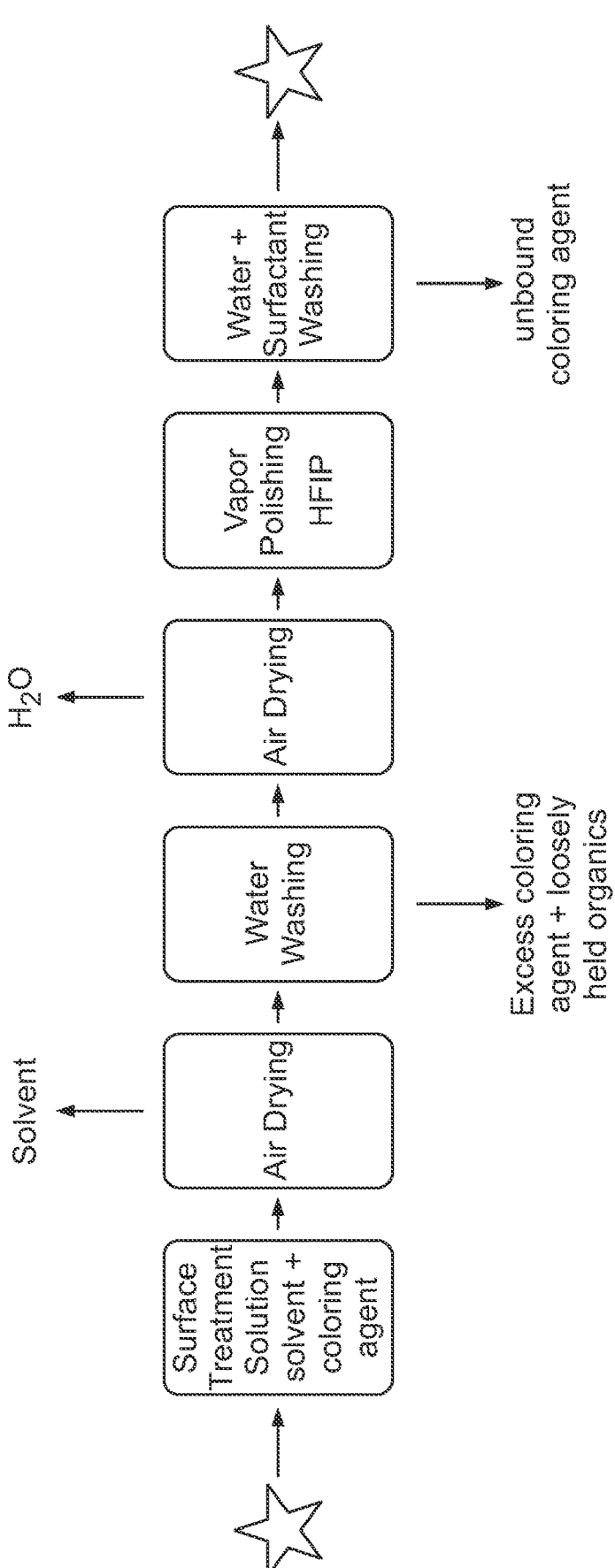
FIG. 2A is a diagrammatic representation of one embodiment of a surface dyeing method according to the present technology.
Figure 8:
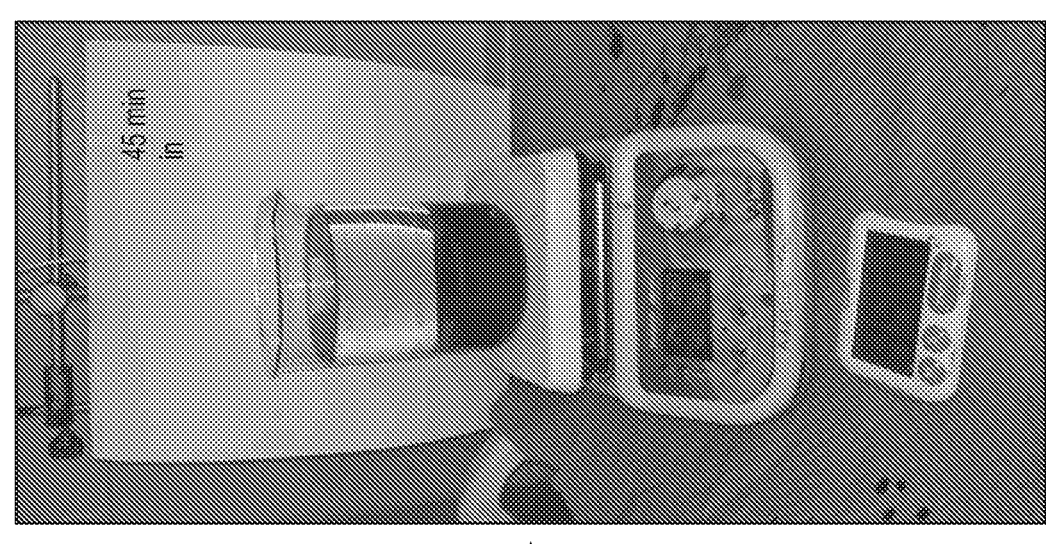
FIG. 8 is a depiction of the results of an alcohol fastness test of a surface dyed part produced by the surface dyeing process according to Comparative Example 3 of the present disclosure.
Figure 8:
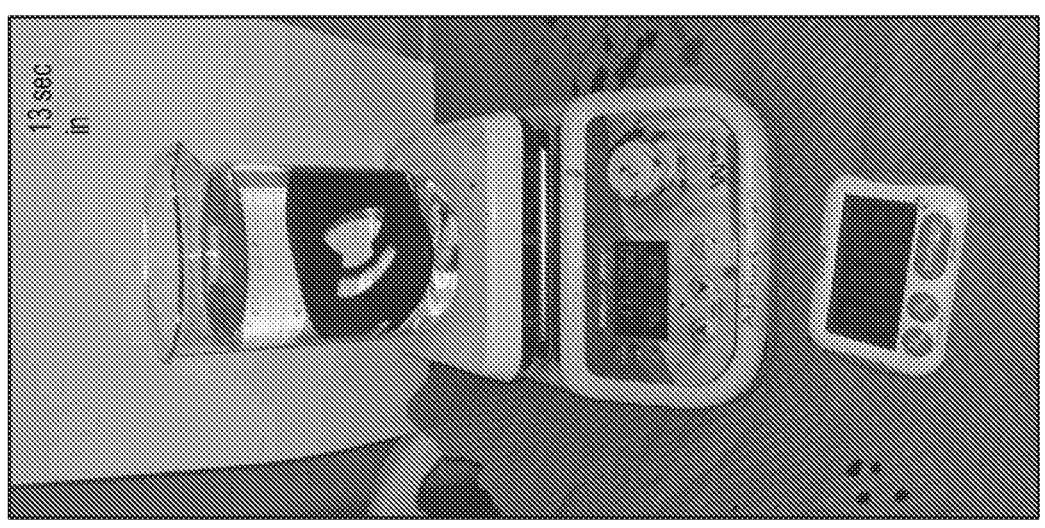
Figure 8:
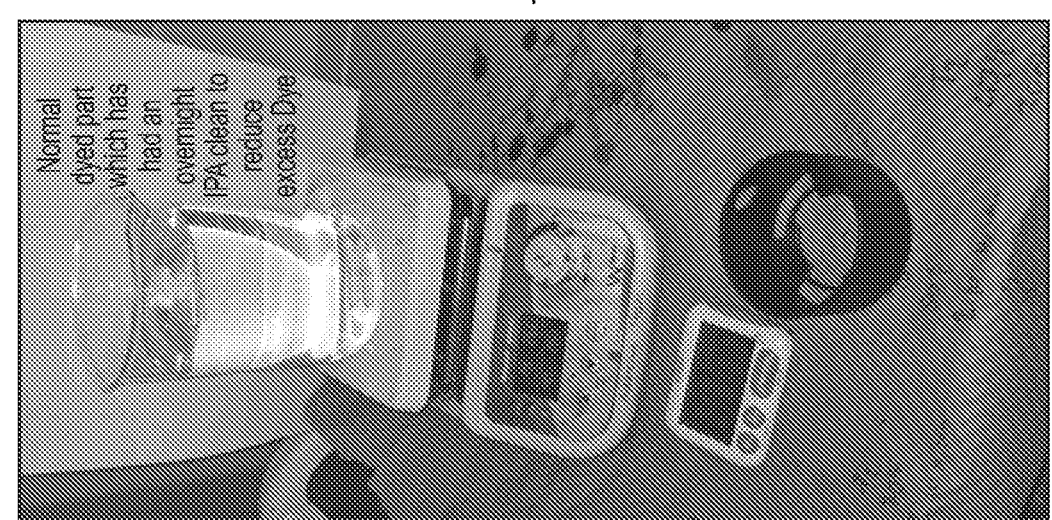

In one aspect, the surface treatment method is a dyeing method. Dyeing of polymer medical parts produces a number of advantages, including hiding minor printing defects in printed parts, producing a smooth-looking aesthetically attractive surface, minimizing light reflection from the surface of the part, hiding stains, optimizing visibility of the part, etc. Unfortunately, conventional dyeing techniques (e.g. as depicted in FIGS. 1 and 8) produce a surface dye which may readily transfer or leach away when exposed to alcohol solutions common in a medical setting. In contrast, the surface dyeing method of the present technology produces a polymer part coated with an alcohol fast coloring agent. In such an aspect, as depicted in FIG. 2A, the surface dyeing method may include: (i) preparing a surface treatment solution; (ii) submersing a polymer part in the surface treatment solution for a set time period; (iii) air drying the polymer part, (iv) washing the polymer part in a water bath, (v) air drying the part; (vi) vapor polishing the part using vaporized hexafluoroisopropanol or other suitable solvents, and finally (vii) washing the bound coloring agent coated part in a surfactant and water solution to produce a finished surface dyed polymer part.

(i) Preparation of the Surface Treatment Solution

According to some aspects, the surface treatment solution comprises a coloring agent disposed in a solvent and the surface treatment solution is prepared by mixing, dissolving, dispersing, or suspending the coloring agent in the solvent. The coloring agent may include one or more of carbon black, inks (including inks such as those known for use in the additive manufacture of MJF HP parts), and metal suspensions including but not limited to $TiO_2$, InP/ZnS, Cu, Zn, Ag, and Au. The solvent may be one or more selected from the group consisting of isopropyl alcohol, ethanol, methanol, water, and an organic solvent including one or more of toluene, hexane, acetic acid, benzene, chloroform, or cyclohexane. In a preferred embodiment, the solvent is isopropyl alcohol and water, and the coloring agent is carbon black. In this preferred embodiment, the IPA may assist in keeping the carbon black in suspension and may prevent aggregation of the carbon black during part exposure. The surface treatment solution is also configured to facilitate and accelerate the drying process in order to force rapid aggregation of the additive on the surface of the part in a uniform manor.

In some aspects, the coloring agent may be included in an amount of 5 wt % to 80 wt %, more preferably 5 wt % to 60 wt %, or most preferably 10 wt % to 50 wt %, based on a total weight of the solvent. The amount of coloring agent is dependent upon the type of solvent used and the drying conditions chosen. In a preferred embodiment in which the coloring agent is carbon black or a fusing agent and the solvent is isopropyl alcohol and water, the coloring agent is provided in an aqueous suspension, which is mixed with isopropyl alcohol in order to achieve an IPA:(coloring agent (i.e. water+carbon black/fusing agent)) weight ratio of 20% to 50%, more preferably 25% to 45%, or most preferably 30% to 40%. An even more preferred IPA:coloring agent ratio may be targeted to a particular part and/or a desired surface area excess before precipitation occurs. When carbon black is provided in aqueous suspension and mixed with IPA in the disclosed ratios, the carbon black can be maintained in good suspension and may adequately coat the polymer part during submersion. However, if the carbon black is not included according to the disclosed ratios, then the carbon black may precipitate from solution prematurely or may not adequately or evenly coat the polymer part.

(ii) Submersion of the Polymer Part

As shown in FIG. 2A, once the surface treatment solution is prepared, the polymer part may be submerged in the solution for a set time period in order to coat the part with the coloring agent. The time period for submersion may be from 1 minutes to 60 minutes, more preferably from 5 minutes to 20 minutes, and most preferably from 5 minutes to 10 minutes. The specific time period for submersion may be set according to the concentration of coloring agent in the surface treatment solution, the surface geometry and any internal channels of the part, the degree of color desired, and/or the temperature. If the time period is too low, the part may not be adequately coated with coloring agent resulting in poor color uniformity. Conversely, if the time period is too high, the coating layer of the coloring agent may be uneven or excessive with poor surface entanglement.

The temperature of the surface treatment solution during submersion may be from 15° C.-40° C., preferably between 21° C.-25° C. It is necessary to keep the temperature of the surface treatment solution within these ranges in order to reduce undesirable solvent evaporation during the process.

(iii) First Air Drying

As shown in FIG. 2A, once the polymer part has been submerged for the appropriate time period, it may be removed from the surface treatment solution and air dried. Air drying may be conducted in a well-ventilated environment where the solvent will readily evaporate, leaving a layer of the coloring agent evenly distributed on the surface of the polymer part. In a preferred embodiment in which the coloring agent is carbon black or fusing agent and the solvent is isopropyl alcohol and water, the IPA may evaporate quickly during the air drying, causing the coloring agent to collapse quickly onto the surface of the part avoiding drip or run marks.

At this stage, while the coloring agent is coated on the surface of the part, it is not bound or fixed to the polymer part. Thus, the coloring agent is not alcohol fast at this time and may transfer or leach if exposed to alcohol.

Air drying may be conducted for a time of 60 min to 12 hours, with a most preferable time depending on the geometry and airflow conditions used in the setup. Air drying may be conducted at a temperature of 15° C.-30° C., with an appropriate temperature depending on the solvent mix ratio and the airflow conditions. Most preferably, air drying is conducted at room temperature (21° C.). In a preferred embodiment in which carbon black or fusing agent in IPA and water is used, the IPA may readily evaporate during the drying step, helping the suspended carbon black set to the surface of the part evenly.

(iv) Water Washing

Figure 3:
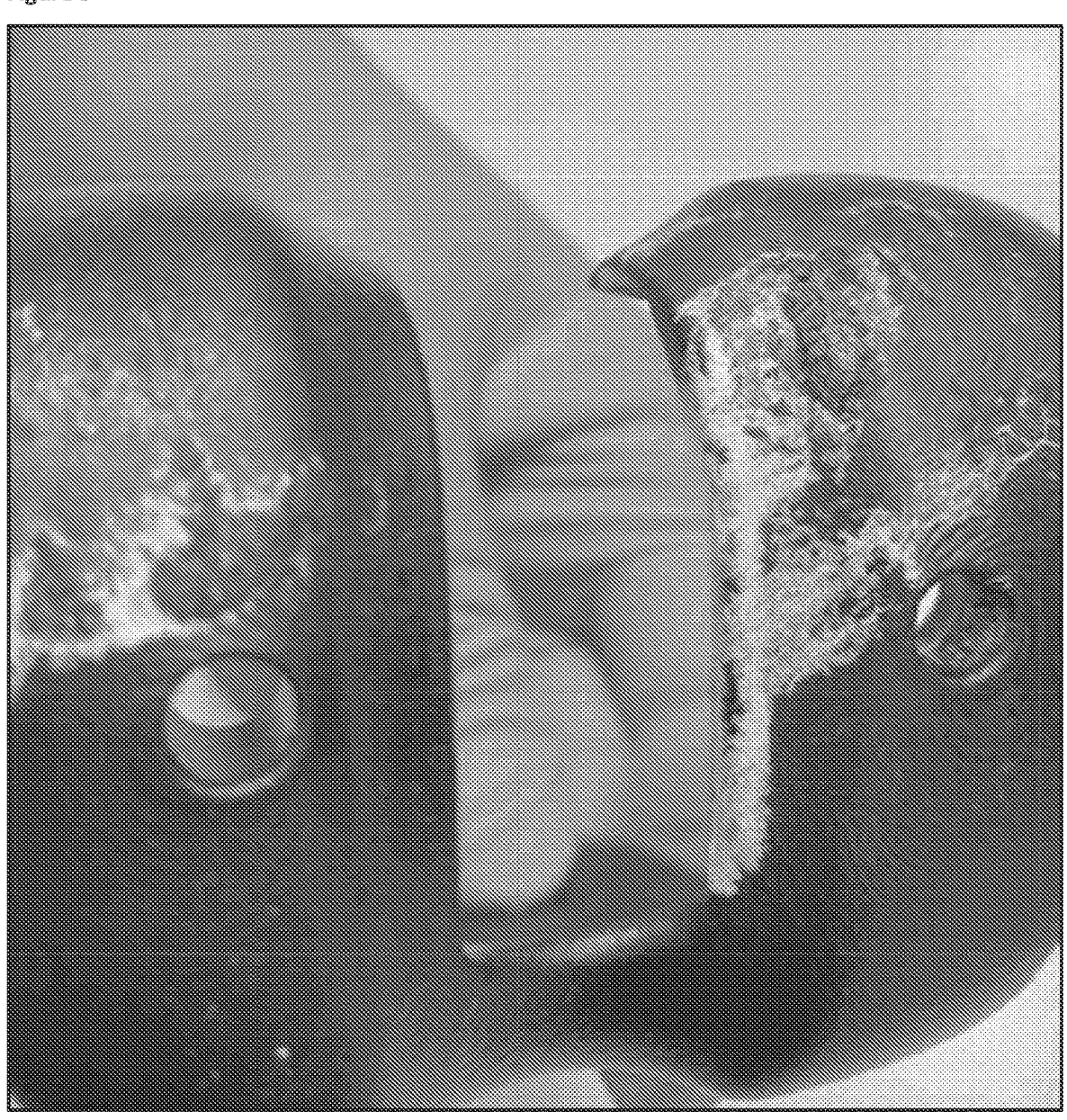
FIG. 3 is a depiction of the results of a surface dyeing process, in which a water washing step is not conducted.

As shown in FIG. 2A, after air drying, the coated part may be washed in a water bath to remove excess coloring agent and any other undesirable contaminants, e.g. organic contaminants used to keep the coloring agent in solution, such as 2-pyrrolidone and glycol. For example, in a preferred embodiment in which carbon black in IPA and water is used, water washing facilitates removal of excess carbon black as well as removal of any organic ligands (e.g. 2-pyrrolidone and/or glycol) used to help maintain the carbon black in suspension. In embodiments where the surface treatment method is a dyeing method, the water washing step is essential to the production of an evenly dyed and colored part. As shown in FIG. 3, if water washing is not conducted, the resulting part may contain undesirable white crusts caused by remaining organics or undesirable colored crusts caused by failure to remove excess coloring agent. However, in alternative embodiments where the surface treatment method is not a dyeing method, the water washing step may not be necessary. For example, in embodiments where the surface treatment solution is a metal suspension, organic additives such as 2-pyrrolidone and glycol may not be needed to maintain the suspension. Accordingly, removal of these organics to avoid a crust-forming reaction with HFIP during vapor polishing may be unnecessary.

Water washing may be conducted for a time period of 5-20 min depending on the geometry of the part. Water washing may be conducted at a temperature of 15° C.-30° C., under conditions of active agitation.

(v) Second Air Drying

As shown in FIG. 2A, once the polymer part has been washed in water to remove excess coloring agent and any contaminants, it may then be air dried again. Air drying may be conducted in a well-ventilated environment where the water will readily evaporate, without leaving water marks on the surface of the part. At this stage, while the coloring agent is coated on the surface of the part, it is not bound or fixed to the polymer part. Thus, the coloring agent is not alcohol fast at this time and may transfer or leach if exposed to alcohol.

Air drying may be conducted for a time period up to 24 hours, depending on the geometry of the part and the solvent solution used along with airflow settings. Air drying may be conducted at a temperature of 15-30° C.

(vi) Vapor Polishing

As shown in FIG. 2A, once the coated part has been air dried for a second time, it may then subjected to vapor polishing. During the vapor polishing process, hexafluoroisopropanol (HFIP) or other suitable solvent is used to reflow the outer surface of the part, which is at this stage evenly coated with coloring agent. Upon exposure to HFIP or other solvent during the vapor polishing, the coloring agent consolidated on the surface of the part is internalized into the polymer in order to create a uniform color. This internalization effectively binds or fixes the coloring agent to the part such that it becomes alcohol fast, and will not transfer or leach in response to alcohol exposure. In a preferred embodiment, the part is vapor polished with 100-200 ml HFIP at 200-450 mbar for 200-1700 seconds.

(vii) Water & Surfactant Washing

Finally, as shown in FIG. 2A, the part may be washed at room temperature in a surfactant and water solution in order to remove any unbound coloring agent which was not trapped within the polymer during the vapor polishing step. This final washing step produces a finished surface dyed polymer part in which all coloring agent is fixed within the polymer and thus will not leach or transfer in response to alcohol exposure.

Surface Additive Method

In another aspect, the surface treatment method is a method for adding an active compound to the surface of a polymer part. The active compound may include antimicrobial agents, such as silver (Ag), gold (Au), and zinc (Zn) metal particles at varying particle sizes. In a preferred embodiment, the active compound may be a metal nanoparticle including at least one of silver, gold, copper, or zinc. Such nanoparticles are known for their antimicrobial properties, which make them an especially useful surface additive or coating for printed parts used in the medical field. Due to their nature of manufacture, additive parts may have a higher surface roughness than most injection molded parts used in the medical field. This increased surface roughness can provide an added challenge in maintaining cleanliness as the increased surface area may provide increased opportunity for microbial growth while simultaneously being difficult to clean, as there may be surfaces which are not readily exposed to cleaning agents. This problem is particularly heightened with respect to black or colored parts which may not show blood splatter or other contaminants as readily as white surfaces. Accordingly, adding an antimicrobial active compound to the surface of a polymer part can be especially useful in reducing bioload despite these challenges.

Figure 2B:
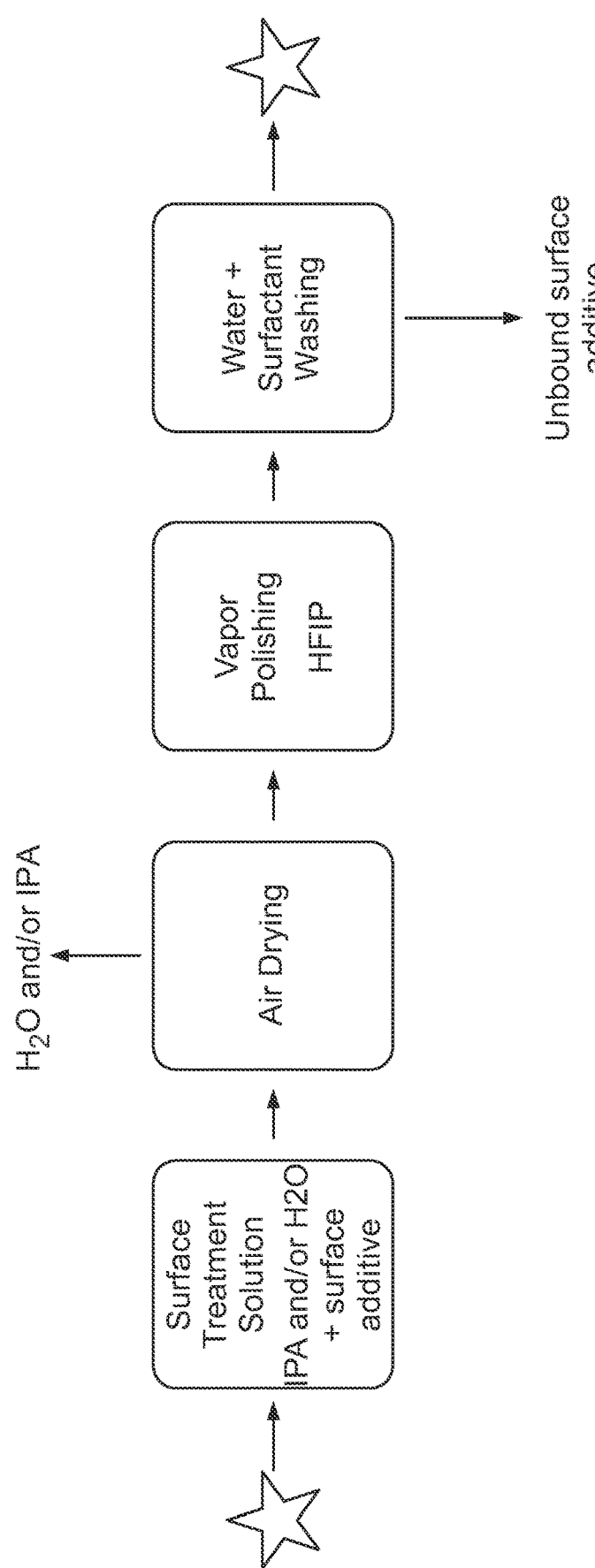
FIG. 2B is diagrammatic representation of one embodiment of a surface additive coating method according to the present technology.

However, conventional antimicrobial coatings may be limited in effectiveness or may be unsuitable for long term use in the medical field because exposure to alcohol solutions (i.e. such as those commonly found in medical wipes), may deteriorate the surface coating or cause it to transfer or leach away. Accordingly, aspects of the present technology provide a method for producing a polymer part coated with an alcohol fast antimicrobial agent, such that the antimicrobial agent does not leach or transfer when contacted with alcohol solutions. In such an aspect, as depicted in FIG. 2B, the surface additive method may include: (i) preparing a surface treatment solution; (ii) submersing a polymer part in the surface treatment solution for a set time period; (iii) air drying the polymer part, (iv) vapor polishing the part using vaporized hexafluoroisopropanol, and finally (v) washing the part in a surfactant and water solution to produce a finished polymer part with an alcohol fast active compound.

(i) Preparation of the Surface Treatment Solution

According to some aspects, the surface treatment solution comprises an active compound disposed in a solvent and the surface treatment solution is prepared by mixing, dissolving, dispersing, or suspending the active compound in the solvent. The active compound may be one or more selected from the group consisting of antimicrobial agents, and Ag, Au, Zn metal particles at varying particle sizes. Antimicrobial agents of the present technology include metal nanoparticles comprising at least one of silver, gold, copper, or zinc. The solvent may be one or more selected from the group consisting of isopropyl alcohol, water, and an organic solvent including one or more of toluene, hexane, acetic acid, benzene, chloroform, or cyclohexane. In a preferred embodiment, the solvent is isopropyl alcohol and water, and the active compound is a metal nanoparticle.

In some aspects, the active compound may be included in an amount of 5 wt % to 80 wt %, more preferably 0.1 wt % to 60 wt %, or most preferably 0.1 wt % to 10 wt %, based on the solvent. In a preferred embodiment in which the active compound is a metal nanoparticle and the solvent is isopropyl alcohol and water, the surface treatment solution is in the form of a colloidal suspension, in which the metal nanoparticle which is provided in a concentration sufficient to coat the surface area of the part without impacting the colour of the part, with respect to the solvent. This will vary based on the intended device use and cleaning environment the part will be exposed to. In such a preferred embodiment, the concentration of the metal nanoparticle may be selected based upon the species of metal used and the geometry, composition, and color of the part, in order to avoid discoloration of the final part.

(ii) Submersion of the Polymer Part

As shown in FIG. 2B, once the surface treatment solution is prepared, the polymer part may be submerged in the solution for a set time period in order to coat the part with the active compound. The time period for submersion may be from 10 minutes to 60 minutes, more preferably from 5 minutes to 20 minutes, and most preferably from 5 minutes to 10 minutes. The specific time period for submersion may be set according to the concentration of active compound in the surface treatment solution, the surface geometry and any internal channels of the part, the degree of surface coating desired, the temperature and/or the degree of agitation used over a fixed time. If the time period is too low, the part will not be adequately coated with the active compound. Conversely, if the time period is too high, the coating layer of the active compound may be uneven or excessive, and/or the part may become discolored. The temperature of the surface treatment solution during submersion may be from 15° C.-30° C.

(iii) Air Drying

As shown in FIG. 2B, once the polymer part has been submerged for the appropriate time period, it may be removed from the surface treatment solution and air dried. Air drying may be conducted in a well-ventilated environment where the solvent will readily evaporate, leaving a layer of the active compound evenly distributed on the surface of the polymer part. At this stage, while the active compound is coated on the surface of the part, it is not bound or fixed to the polymer part. Thus, the active compound is not alcohol fast at this time and may transfer or leach if exposed to alcohol.

Air drying may be conducted for a time period of up to 24 hours, depending on the concentration of solvent used as well as the air flow setup. Air drying is conducted at a temperature of 15° C.-30° C.

(iv) Vapor Polishing

As shown in FIG. 2B, once the coated part has been air dried, it may then subjected to vapor polishing. During the vapor polishing process, in a preferred embodiment, hexafluoroisopropanol (HFIP) is used to reflow the outer surface of the part, which is at this stage evenly coated with active compound. Upon exposure to HFIP during the vapor polishing, the active compound consolidated on the surface of the part is internalized into the polymer in order to create a uniform fixed active coating. This internalization effectively binds or fixes the active compound to the part such that it becomes alcohol fast, and will not transfer or leach in response to alcohol exposure. In a preferred embodiment, vapor polishing is conducted using 100-200 mL HFIP at 200-450 mbar for 200-1700 seconds.

(v) Water & Surfactant Washing

Finally, as shown in FIG. 2B, the part may be washed at room temperature in a surfactant and water solution in order to remove any unbound active compound which was not trapped within the polymer during the vapor polishing step. This final washing step produces a finished surface treated polymer part in which all active compound is fixed within the polymer and thus will not leach or transfer in response to alcohol exposure.

EXAMPLES

Hereinafter, exemplary embodiments of the present technology are described in detail. However, the present technology may be implemented in various different forms and is not limited to these embodiments.

Example 1

1400 mL of IPA and 600 mL fusing agent (or carbon black with suspension ligands and water made up to 600 mls) in an aqueous suspension were mixed at 1000 rpm for 20 minutes at 40° C. in a dye tank in order to prepare a surface treatment solution at room temperature. Printed polymer parts were submerged in the surface treatment solution in the dye tank and maintained there for 25 minutes at 21° C. before being removed and air dried. The parts were then washed by dipping once in water, before being air dried again. The parts were then subjected to vapor polishing using HFIP, before being finally washed in a water/surfactant mixture to produce a finished surface dyed part.

Figures 4A, 4B:
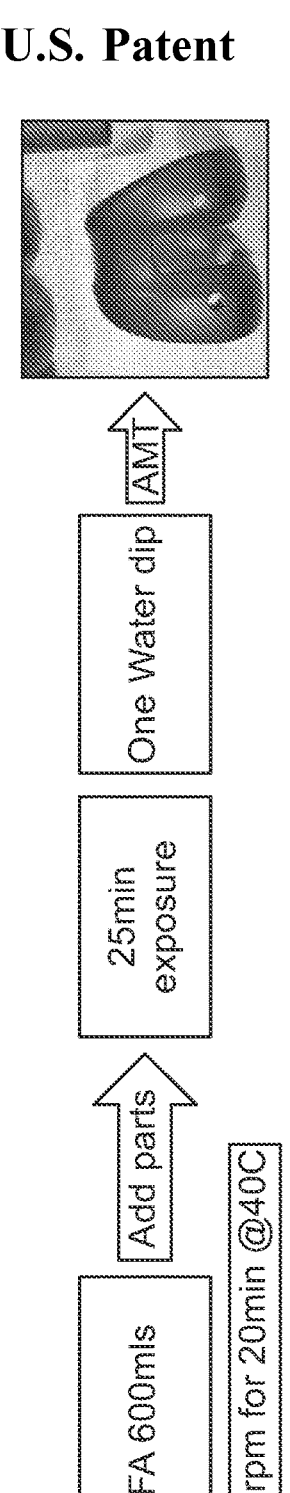
FIG. 4A is a diagrammatic representation of a surface dyeing process according to Example 1 of the present disclosure.
FIG. 4B is a depiction of the results of the surface dyeing process according to Example 1 of the present disclosure.

As shown in FIGS. 4A-B, the process of Example 1 produced an evenly coated black dyed polymer part, without any crusting, black or white precipitates, or other surface defects.

Figure 5A:
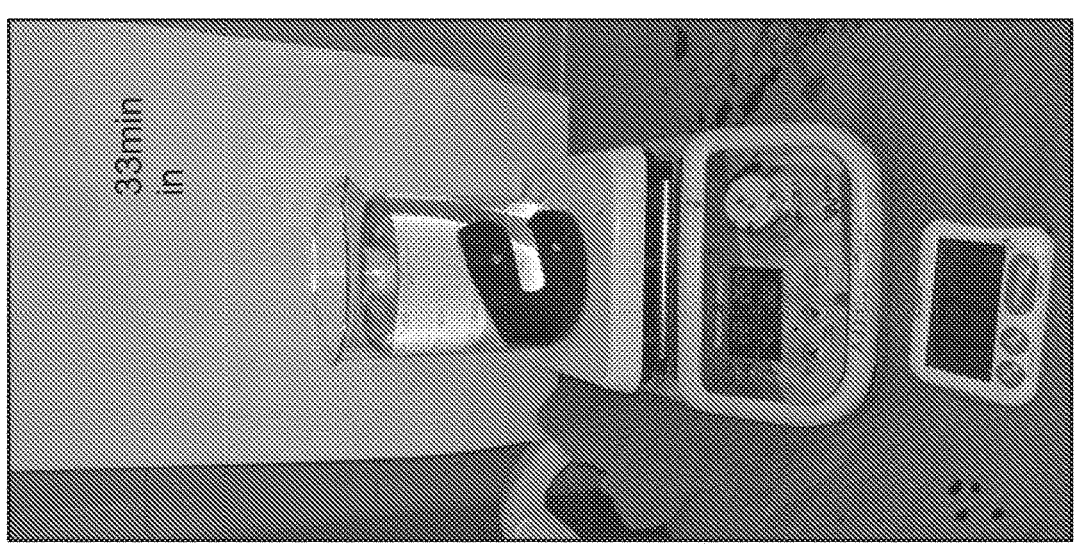
FIG. 5A is a depiction of the results of an alcohol fastness test of a surface dyed part produced by the surface dyeing process according to Example 1 of the present disclosure.
Figure 5A:
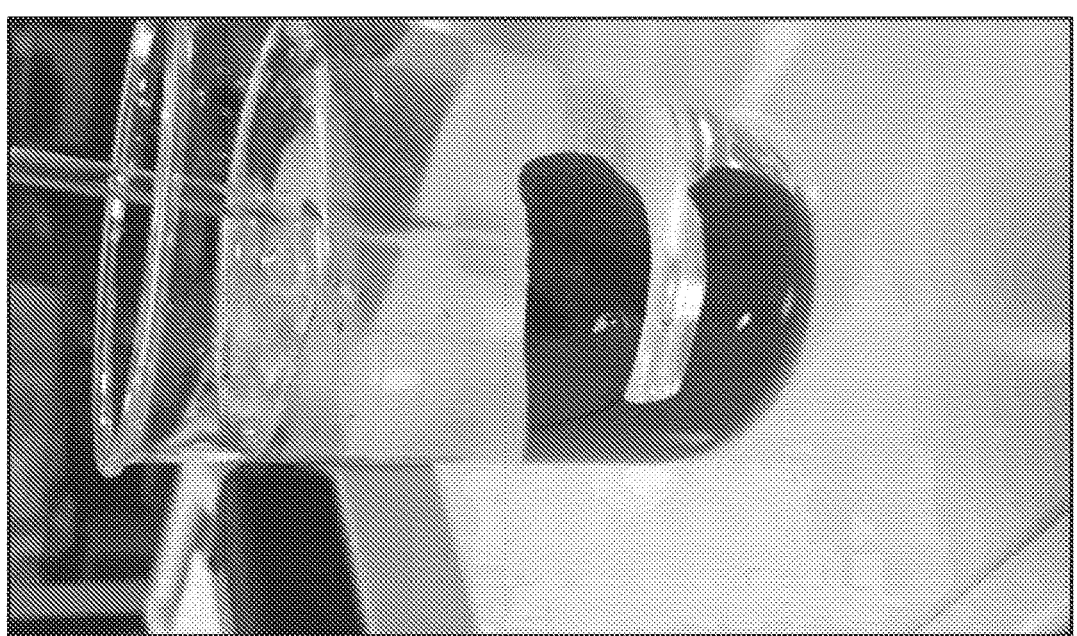
Figure 5B:
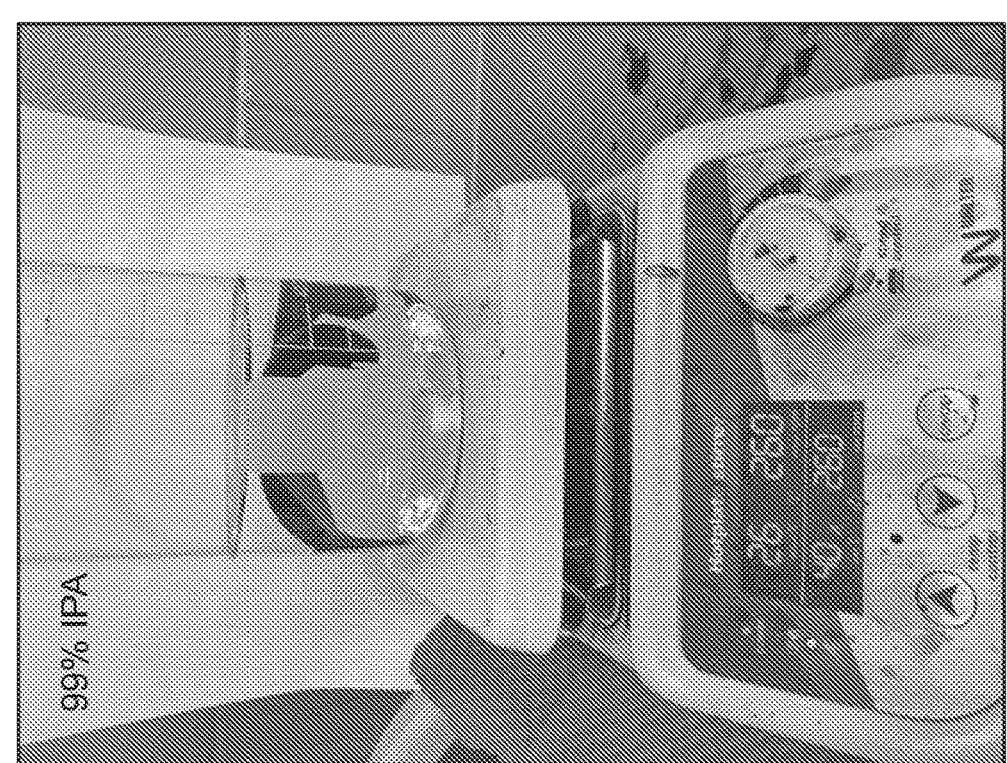
FIG. 5B is a depiction of the results of an alcohol fastness test of a surface dyed part produced by the surface dyeing process according to Example 1 of the present disclosure.
Figure 5B:
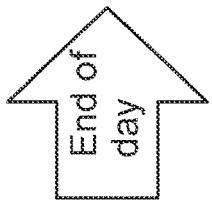
Figure 5B:
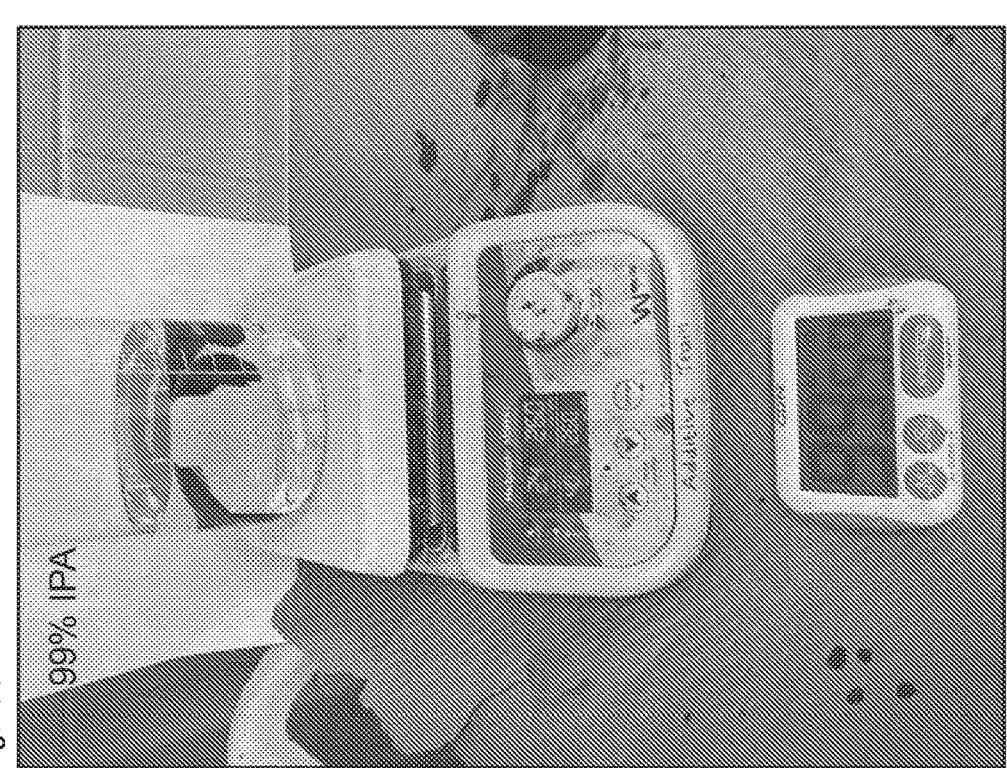

As shown in FIG. 5A, the surface dyed part of Example 1 displayed no leaching or transfer of dye when submerged in a 30% IPA solution at room temperature for 33 minutes. As shown in FIG. 5B, the surface dyed part of Example 1 displayed no leaching or transfer of dye when submerged in a 99% IPA solution at room temperature for a full work day, or approximately 8 hours.

Comparative Example 1

A finished surface dyed part was produced using the same method as in Example 1, except that the parts were not subjected to a water wash.

Figure 6:
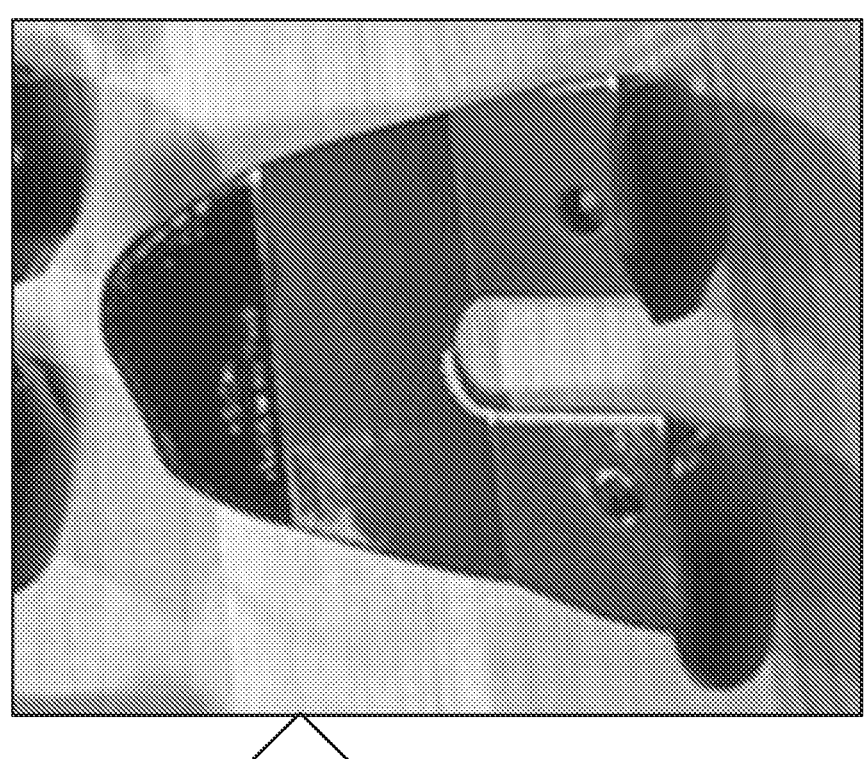
FIG. 6 is a diagrammatic representation of a surface dyeing process according to Comparative Example 1 of the present disclosure and a depiction of the results of the same process.

As shown in FIG. 6, the process of Comparative Example 1 produced a polymer part containing undesirable white crusting and precipitates on the surface.

Comparative Example 2

A finished surface dyed part was produced using the same method as in Example 1, except that the parts were maintained submerged in the surface treatment solution overnight.

As shown in FIG. 7, the process of Comparative Example 2 produced a polymer part containing surface defects and crusting related to aggregates formed from excess carbon black.

Comparative Example 3

A surface dyed part was produced using the conventional method of submerging a polymer part in water and Rit dye, at an elevated temperature of 95° C., until colour consistency was achieved.

As shown in FIG. 8, the surface dyed part of Comparative Example 3 displayed minor leaching of dye after 13 seconds of submersion in an IPA solution at room temperature and significant leaching of dye after 45 minutes of submersion in an IPA 30% solution at room temperature.

Although preferred embodiments of the present disclosure have been described in detail above, the scope of the present disclosure is not limited thereto, and various modifications and improvements made by those skilled in the art using the basic concepts of the present disclosure, which are defined in the appended claims, also belong to the scope of the present disclosure.

The invention claimed is:

1. A method for producing a surface dyed polymer part, comprising:

preparing a surface treatment solution comprising a solvent and a coloring agent;

submersing a polymer part in the surface treatment solution for a set time period before removing the polymer part from the surface treatment solution to produce a wet coated intermediate part;

air drying the wet coated intermediate part to remove the solvent in order to produce a dry coated intermediate part, washing the dry coated intermediate part in a water bath to produce a wet washed intermediate part, air drying the wet washed intermediate part to remove water in order to produce a dry washed intermediate part;

vapor polishing the dry washed intermediate part by exposing an outer surface to vaporized hexafluoroisopropanol, thereby reflowing the outer surface and internalizing the coloring agent into the polymer part, in order to create a bound coloring agent coated part in which the coloring agent is bound to the polymer part;

washing the bound coloring agent coated part in a surfactant and water solution to produce the surface dyed polymer part.

2. The method of claim 1, wherein the set time period is from 1 minute to 60 minutes.

3. The method of claim 1, wherein a temperature of the surface treatment solution during the submersing is within a range of 15° C.-40° C.

4. The method of claim 1, wherein the air drying of the wet coated intermediate part and of the wet washed intermediate part is conducted at a temperature of 15° C.-30° C.

5. The method of claim 1, wherein the washing the dry coated intermediate part is conducted at a temperature of 15° C.-30° C. for a time period of 5-20 min.

6. The method of claim 1, wherein the vapor polishing is conducted using 100-200 mL HFIP at 200-450 mbar for 200-1700 seconds.

7. The method of claim 1, wherein temperatures of about 95° C. and higher are not used.

8. The method of claim 1, wherein no transfer of the coloring agent occurs when the surface dyed polymer part is exposed to a 30% alcohol solution at room temperature for about 30 minutes.

9. The method of claim 1, wherein no transfer of the coloring agent occurs when the surface dyed polymer part is exposed to a 99% alcohol solution at room temperature for approximately 8 hours.

10. The method of claim 1, wherein:

the coloring agent comprises one or more of carbon black, inks, or metal suspensions comprising $TiO_2$, InP/ZnS, Cu, Zn, Ag, and Au, and the solvent is one or more selected from the group consisting of isopropyl alcohol (IPA), ethanol, methanol, water, toluene, hexane, acetic acid, benzene, chloroform, and cyclohexane.

11. The method of claim 1, wherein the solvent is isopropyl alcohol (IPA) and water, and the coloring agent is carbon black.

12. The method of claim 11, wherein a weight ratio of IPA:(water+carbon black) in the surface treatment solution is 20% to 50%.

13. The method of claim 11, wherein the surface treatment solution contains an organic additive configured to keep the coloring agent in solution.

14. A method for producing a surface treated polymer part, comprising:

preparing a surface treatment solution comprising a solvent and an antimicrobial agent;

submersing a polymer part in the surface treatment solution for a set time period before removing the polymer part from the surface treatment solution to produce a wet coated intermediate part;

air drying the wet coated intermediate part to remove the solvent in order to produce a dry coated intermediate part, vapor polishing the dry coated intermediate part by exposing an outer surface to vaporized hexafluoroisopropanol, thereby reflowing the outer surface and internalizing the antimicrobial agent into the polymer part in order to create a bound antimicrobial agent coated part in which the antimicrobial agent is bound to the polymer part;

washing the bound active compound coated part in a surfactant and water solution to produce the surface treated polymer part.

15. The method of claim 14, wherein the set time period is from 1 minute to 60 minutes.

16. The method of claim 14, wherein the vapor polishing is conducted using 100-200 mL HFIP at 200-450 mbar for 200-1700 seconds.

17. The method of claim 14, wherein no transfer of the antimicrobial agent occurs when the surface treated polymer part is exposed to a 30% alcohol solution at room temperature for about 30 minutes.

18. The method of claim 14, wherein no transfer of the antimicrobial agent occurs when the surface treated polymer part is exposed to a 99% alcohol solution at room temperature for approximately 8 hours.

* * * * *